United States Patent
Katsumura et al.

(10) Patent No.: US 6,753,048 B2
(45) Date of Patent: Jun. 22, 2004

(54) MATERIAL FOR LIQUID-CRYSTAL ALIGNMENT FILM, LIQUID-CRYSTAL DISPLAY ELEMENT, PROCESS FOR ITS PRODUCTION AND LIQUID-CRYSTAL DISPLAY UNIT

(75) Inventors: Nobuhito Katsumura, Yokohama (JP); Haruhiko Kikawa, Tokyo (JP); Takashi Inoue, Yokohama (JP); Masahiro Yamada, Yokohama (JP); Yasuo Koike, Yokohama (JP); Nobuhiko Fukuoka, Ebina (JP); Hiromu Terao, Chiba (JP)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 10/255,713

(22) Filed: Sep. 27, 2002

(65) Prior Publication Data

US 2003/0108686 A1 Jun. 12, 2003

Related U.S. Application Data

(62) Division of application No. 09/949,639, filed on Sep. 12, 2001.

(30) Foreign Application Priority Data

Jul. 13, 2001 (JP) .................................... 2001-212973

(51) Int. Cl.[7] ................................................. C09K 19/56
(52) U.S. Cl. ..................... 428/1.25; 428/1.1; 528/307; 528/308; 528/346; 528/347; 349/123
(58) Field of Search ................................ 428/1.1, 1.25; 528/307, 308, 346, 347; 349/123

(56) References Cited

U.S. PATENT DOCUMENTS 3,498,948 A * 3/1970 Minami et al. ............. 528/126

(List continued on next page.)

FOREIGN PATENT DOCUMENTS

JP         10-197875         7/1998

(List continued on next page.)

OTHER PUBLICATIONS

European Search Report, transmitted Oct. 29, 2002, for EP 01 12 1854.

*Primary Examiner*—Harold Pyon
*Assistant Examiner*—Sow-Fun Hon
(74) *Attorney, Agent, or Firm*—Antonelli, Terry, Stout & Kraus, LLP (57) ABSTRACT

A material for a liquid-crystal alignment film which comprises as a first polyamide a C3 to C10 alkyl ester of a polyamic acid whose acid anhydride residual group is any of:

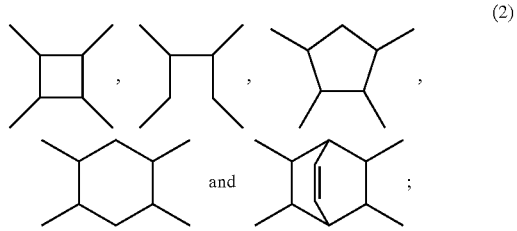

and as a second polyamide a C3 to C10 alkyl ester of a polyamic acid whose acid anhydride residual group is:

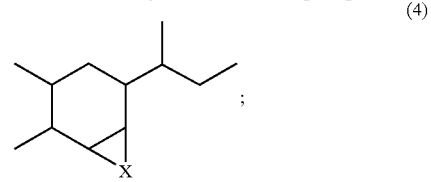

is provided. The use of this material materializes a liquid-crystal alignment film having a high pre-tilt angle of molecules to the substrate, and having superiority in respect of electrical properties such as voltage holding ratio and residual DC voltage, adherence to substrates, printability, and step-covering properties.

2 Claims, 4 Drawing Sheets

U.S. PATENT DOCUMENTS

| | | | |
|---|---|---|---|
| 6,080,832 A | 6/2000 | Chen et al. | 528/170 |
| 6,100,365 A * | 8/2000 | Matsumoto et al. | 528/170 |
| 6,316,574 B1 * | 11/2001 | Tanioka et al. | 528/170 |

FOREIGN PATENT DOCUMENTS

| | | |
|---|---|---|
| WO | WO 99/34252 | 7/1999 |
| WO | WO 00/39633 | 7/2000 |

MATERIAL FOR LIQUID-CRYSTAL ALIGNMENT FILM, LIQUID-CRYSTAL DISPLAY ELEMENT, PROCESS FOR ITS PRODUCTION AND LIQUID-CRYSTAL DISPLAY UNIT

This application is a Divisional application of application Ser. No. 09/949,639, filed Sep. 12, 2001, pending the contents of which are incorporated herein by reference in their entirety.

This application is based on Japanese Patent Application No. 2001-212973 filed in Japan, the contents of which are incorporated hereinto by reference.

BACKGROUND OF THE INVENTION

1. Field of the Invention

This invention relates to a material for liquid-crystal alignment films, a liquid-crystal display element and a process for its production, and a liquid-crystal unit.

2. Description of the Related Art

As liquid-crystal display elements used in liquid-crystal units and so forth, those of a TFT (thin-film transistor) switching system are widely used.

In recent years, improvements in their display performance are being achieved, and liquid-crystal alignment films used therein have become required to satisfy various characteristics simultaneously.

Liquid-crystal alignment film characteristics required in this TFT switching system are known to include, as disclosed in, e.g., Japanese Patent Application Laid-open No. 10-197875, pre-tilt angles of liquid-crystal molecules, voltage holding ratio, and residual DC (direct current) voltage of direct-current voltage, as well as adherence to substrates with transparent electrodes, and printability free of any non-uniformity or pinholes. Meanwhile, in order to meet requirements for higher precision in future liquid-crystal display elements and for changes in display modes, liquid-crystal alignment films are required to have good step (difference in level)-covering properties against any differences in surface levels of TFT substrates.

Liquid-crystal alignment films are commonly obtained by coating a solution of a soluble polyimide or polyimide precursor on a substrate, followed by baking to effect curing to form a polyimide film, which is then subjected to rubbing to make alignment. In order to improve the step-covering properties, it may be contemplated to make the soluble polyimide or polyimide precursor solution have a higher solid-matter concentration to form a thicker film so that the differences in levels can be covered. However, in usual cases, solvent-soluble polyimide or polyimide precursors are so low soluble that there has been a limit to the improving of step-covering properties by making the solid-matter concentration higher.

SUMMARY OF THE INVENTION

Accordingly, an object of the present invention is to provide a material for a liquid-crystal alignment film which satisfies fundamental prescribed properties such as voltage holding ratio, pre-tilt angles, residual DC voltage, adherence to substrates, and printability, and also has superior step-covering properties, and to provide a liquid-crystal display element making use of this material, a process for producing the device, and a liquid-crystal display unit having the device.

To achieve the above object, the present invention provides a material for a liquid-crystal alignment film which comprises:

(i) a first polyamide having a first repeating unit represented by the following Formula (1) and having a weight-average molecular weight of from 5,000 to 200,000;

wherein $R^1$ is a tetravalent organic group represented by any of the following structural formulas (2), $R^2$ is a divalent organic group, and $R^3$ is an alkyl group having 3 to 10 carbon atoms or a fluoroalkyl group having 3 to 10 carbon atoms;

(ii) a second polyamide having a second repeating unit represented by the following Formula (3) and a third repeating unit represented by the following Formula (5), and having a weight-average molecular weight of from 5,000 to 200,000. The number of the third repeating unit with respect to the number of total repeating units in one molecule of the second polyamide may preferably be in a proportion of from 1 mole % to 50 mole %.

wherein $R^4$ is a tetravalent organic group represented by the following Formula (4), $R^5$ is a divalent organic group, and $R^6$ is an alkyl group having 3 to 10 carbon atoms or a fluoroalkyl group having 3 to 10 carbon atoms.

wherein X is a saturated or unsaturated hydrocarbon group.

wherein $R^7$ is a straight-chain alkyl group having 6 to 20 carbon atoms or a straight-chain fluoroalkyl group having 6 to 20 carbon atoms.

The present invention also provides a liquid-crystal display element comprising:

two substrates each having an electrode (i.e. atleast one electrode), wherein the electrode of one substrate and the electrode of another substrate are disposed opposingly to each other;

a liquid crystal held between the substrates; and a liquid-crystal alignment film disposed between the liquid crystal and the electrode;

the liquid-crystal alignment film each comprising a cured product of the material for a liquid-crystal alignment film according to the present invention;

and also provides a liquid-crystal display unit having the device.

The present invention still also provides a process for producing a liquid-crystal display element; the process comprising:

a resin film formation step for forming the above material for a liquid-crystal alignment film according to the present invention into a film on a substrate having an electrode, to obtain a resin film; and a rubbing step for rubbing the resin film to make the resin film into a liquid-crystal alignment film.

BRIEF DESCRIPTION OF TH-E DRAWINGS

These and other features, objects and advantages of the present invention will become more apparent from the following description when taken in conjunction with the accompanying drawings wherein.

DETAILED DESCRIPTION OF THE INVENTION

The material for a liquid-crystal alignment film according to the present invention is, as described above, a composition comprising the first and second polyamides. Since these polyamides are polyamide acid esters, any carboxyl groups having high polarity do not stand bare to the surfaces.

Since also they are esters of alkyl groups having 3 or more carbon atoms and so having a relatively great steric hindrance, their molecular chains have highly bending properties. Hence, the first and second polyamides have a high solubility to non-polar solvents. Accordingly, the use of these polyamides enables preparation of solutions in a high solid-matter concentration, so that a material for liquid-crystal alignment films which has high step-covering properties can be obtained. Moreover, the material for liquid-crystal alignment films according to the present invention have so high a polyamide solubility that it can promise a high storage stability of its solution.

The first polyamide may preferably be a copolymer further having a fourth repeating unit represented by the following Formula (6). Even in the case when the first polyamide contains this fourth repeating unit, the number of the first repeating unit with respect to the number of total repeating units in one molecule of the first polyamide may preferably be in a proportion of at least 30 mole % in terms of material ratio of acid anhydrides.

wherein $R^8$ is a tetravalent organic group represented by any of the following structural formulas (7).

In the material for liquid-crystal alignment films according to the present invention, the first polyamide and the second polyamide may be in a weight ratio selected appropriately as occasion calls, as long as the material can satisfy the required characteristics such as pre-tilt angles, voltage holding ratio and residual DC voltage, and, in view of these characteristics, may usually be in a weight ratio of from 99:1 to 5:95. They may preferably be in a weight ratio of from 95:5 to 50:50.

Because of an improvement in adherence to the substrate, at least part of a plurality of $R^2$s contained in one molecule of the first polyamide may also have at least one of a carboxyl group and a hydroxyl group as a substituent, or may preferably be an organic group represented by the following Formula (8) and may more preferably be an organic group represented by the following Formula (9).

In the formulas, $Y^1$ to $Y^4$ are each a hydrogen atom, a hydroxyl group, a carboxyl group having 1 to 8 carbon atoms, an aldehyde group having 1 to 8 carbon atoms, an alkyl group having 1 to 8 carbon atoms or an aryl group having 6 to 18 carbon atoms. $R^9$ is a divalent organic group such as an alkyl group or a carbonyl group, or an oxygen atom.

At least part of a plurality of diamine residual groups ($R^2$ and/or $R^5$) contained in one molecule(s) of the first polyamide and/or the second polyamide may be made into a silicon-containing organic group. This enables an improvement in the adherence to substrate and the printability. The silicon-containing organic group with respect to the total number of the diamine residual groups contained in the first or second polyamide may preferably be in a proportion of from 0 mole % to 80 mole % for each polyamide. In particular, it is effective to make part of the diamine residual group $R^5$ of the second polyamide into the silicon-containing organic group.

The silicon-containing organic group used here may preferably contain a siloxane structure in order to improve adherence and printability, and may particularly preferably be at least one of organic groups represented by any of the following structural formulas (10).

(10)

The group represented by $R^4$ in the second polyamide is the tetravalent organic group represented by the above Formula (4). Herein, X is a saturated or unsaturated hydrocarbon group, which forms a condensed ring together with a cyclohexane ring. This hydrocarbon group X may preferably have 3 to 8 carbon atoms at its part constituting the closed-ring structure, and may further have, as a substituent or substituents, an alkyl group having 1 to 8 carbon atoms and/or an aryl group having 6 to 18 carbon atoms. The group represented by $R^4$ may preferably be, e.g., an organic group represented by any of the following structural formulas (11).

(11)

wherein $Z^1$ to $Z^8$ are each any of a hydrogen atom, an alkyl group having 1 to 8 carbon atoms and an aryl group having 6 to 18 carbon atoms; and n is an integer of 1 to 8, m is an integer of 1 to 4, p is an integer of 1 to 8, q is an integer of 1 to 4, r is an integer of 1 or 2, s is an integer of 1 to 4, t is an integer of 1 or 2, u is an integer of 1 to 4, v is an integer of 1 or 2, and w is an integer of 1 to 4.

The group represented by $R^7$ in the third repeating unit may also preferably be a straight-chain alkyl group such as a hexadecyl group, or its fluoride a straight-chain fluoroalkyl group. This enables materialization of stabler and higher pre-tilt angles.

The material for liquid-crystal alignment films according to the present invention may further optionally contain a solvent. There are no particular limitations on the total content of the first and second polyamides as long as they are in a uniform liquid form. Usually, the solvent may be used so as to provide a solid-matter concentration of from 1% by weight to 70% by weight. A higher solid-matter concentration is preferred in view of the step-covering properties. In view of the printability, it may be from 1 to 15% by weight.

There are no particular limitations on the solvent usable in the present invention as long as it can dissolve the first and second polyamides.

For example, preferred are good solvents such as 2-pyrrolidone, N-methylpyrrolidone, N-ethylpyrrolidone, N-vinylpyrrolidone, N,N-dimethylacetamide, N,N-dimethylformamide and γ-butyrolactone.

Even a poor solvent in which the first and/or second polyamide(s) is/are low soluble, it may also be used in the form of a mixture with the above good solvent as long as the dissolving power of the whole solvent is not damaged, The poor solvent usable in such a form may include, e.g., ethyl cellosolve, butyl cellosolve, ethyl Carbitol, butyl Carbitol, ethyl Carbitol acetate, and ethylene glycol.

The first and second polyamides used in the present invention may each be isolated as a precipitate by, e.g., allowing a tetracarboxylic diester obtained by the reaction of a tetracarboxylic dianhydride with an alcohol, and a diamine to react in a polar solvent to effect polymerization, and introducing the resultant polyamide solution into a poor solvent such as methanol, ethanol or water. The material for liquid-crystal alignment films may be prepared by purifying the polyamides thus isolated and thereafter dissolving again in solvents the first and second polyamides obtained. Here, these polyamides having a polyamide acid ester structure may be converted into polyimides by heating them at 100° C. to 350° C.

Tetracarboxylic dianhydrides used as materials for synthesizing the first and second polyamides may include the following. Incidentally, as for these acid dianhydrides, one compound may be used alone or two or more compounds may be copolymerized.

In the synthesis for the first polyamide, a tetracarboxylic dianhydride used as a material for the first repeating unit may include, as specific examples, cyclobutanetetracacboxylic dianhydride, cyclopentanetetracacboxylic dianhydride, cyclohexanetetracacboxylic dianhydride and butanetetracacboxylic dianhydride. Of these, cyclobutanetetracacboxylic dianhydride is preferred.

In the synthesis for the first polyamide, a tetracarboxylic dianhydride used as a material for the fourth repeating unit may include, as specific examples, pyromellitic dianhydride, biphenyltetracacboxylic dianhydride, naphthalenetetracacboxylic dianhydride and terphenyltetracacboxylic dianhydride. Of these, pyromellitic dianhydride is preferred.

A tetracarboxylic dianhydride used as a material for synthesizing the second polyamide may include, as a specific example, 3,4-dicarboxy-1,2,3,4-tetrahydro-1-naphthalenesuccinic dianhydride.

Diamines used as materials for synthesizing the first and second polyamide may include the following. Incidentally, as for these diamines, one compound may be used alone or two or more compounds may be copolymerized.

A diamine used as a material for synthesizing the first polyamide may include, as specific examples, aromatic diamines such as 3,5-daminobenzoic acid, 4,4'-diamino-3,3'-dicarboxydiphenylmethane, p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane and 1,1,1,3,3,3-hexafluoro-2,2-bis[4-(4-aminophenoxy)phenyl]propane; alicyclic diamines such as diaminodicylcohexylmethane, diaminodicylcohexyl ether and diaminocyclohexane; and aliphatic diamines such as 1,2-diaminoethane, 1,3-diaminopropane, 1,4-diaminobutane and 1,6-diaminohexane.

Of these, 3,5-daminobenzoic acid and 4,4'-diamino-3,3'-dicarboxydiphenylmethane, having a carboxyl group, are preferred, and 4,4'-diamino-3,3'-dicarboxydiphenylmethane is particularly preferred.

A diamine used as a material for synthesizing the second polyamide may include, as specific examples, aromatic diamines such as p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane and 1,1,1,3,3,3-hexafluoro-2,2-bis[4-(4-aminophenoxy)phenyl]propane; alicyclic diamines such as diaminodicylcohexylmethane, diaminodicylcohexyl ether and diaminocyclohexane; and aliphatic diamines such as 1,2-diaminoethane, 1,3-diaminopropane, 1,4-diaminobutane and 1,6-diaminohexane.

In synthesizing the first and/or second polyamide(s), in order to improve the adherence to substrate, a diaminosiloxane may preferably be used in combination with these diamines and be copolymerized. The diaminosiloxane usable here may include 1,3-bis(3-aminopropyl)tetramethyldisiloxane, bis(4-aminophenoxy)dimethysilane and 1,3-bis(4-aminophenoxymethyl)-1,1,3,3-tetramethyldisiloxane. For these diaminosiloxanes, too, one compound may be used alone, or two or more compounds may be used in combination and be copolymerized.

Alcohols usable as materials for synthesizing the first polyamide and for the second repeating unit of the second polyamide is an alkyl alcohol having 3 to 10 carbon atoms or a fluoride thereof. As specific examples, they may include n-propanol, isopropanol, n-butanol, n-perfluoropropanol, perfluoroisopropanol and n-perfluorobutanol. Any of these may be used alone, or may be used in the form of a mixture of two or more types.

An alcohol usable as a material for synthesizing the third repeating unit of the second polyamide is a straight-chain alkyl alcohol having 6 to 20 carbon atoms, such as n-pentadecanol or n-hexadecanol; or a fluoride thereof, including straight-chain fluoroalkyl alcohols having 6 to 20 carbon atoms, such as n-perfluoropentadecanol and n-perfluorohexadecanol. Any of these may be used alone, or may be used in the form of a mixture of two or more types.

As solvents for reaction solutions for synthesizing the first and second polyamides, usable are, e.g., N,N-dimethylformamide, N,N-dimethylacetamide, N-methyl-2-pyrroliodne, N-methylcaprolactam, dimethylsulfoxide, tetramethylurea, pyridine, dimethylsulfone, hexamethylphosphoramide and butyl lactone. Any of these may be used alone or in the form of a mixture. A solvent in which polyamides are insoluble or slightly soluble may also be mixed as long as it is in a mixing ratio within the range in which a uniform solution is obtainable.

The liquid-crystal display element of the present invention is described below. The liquid-crystal display element of the present invention may have a liquid-crystal alignment film comprised of a cured product of the material for liquid-crystal alignment films according to the present invention, without any particular limitations on other construction.

Figure 1:
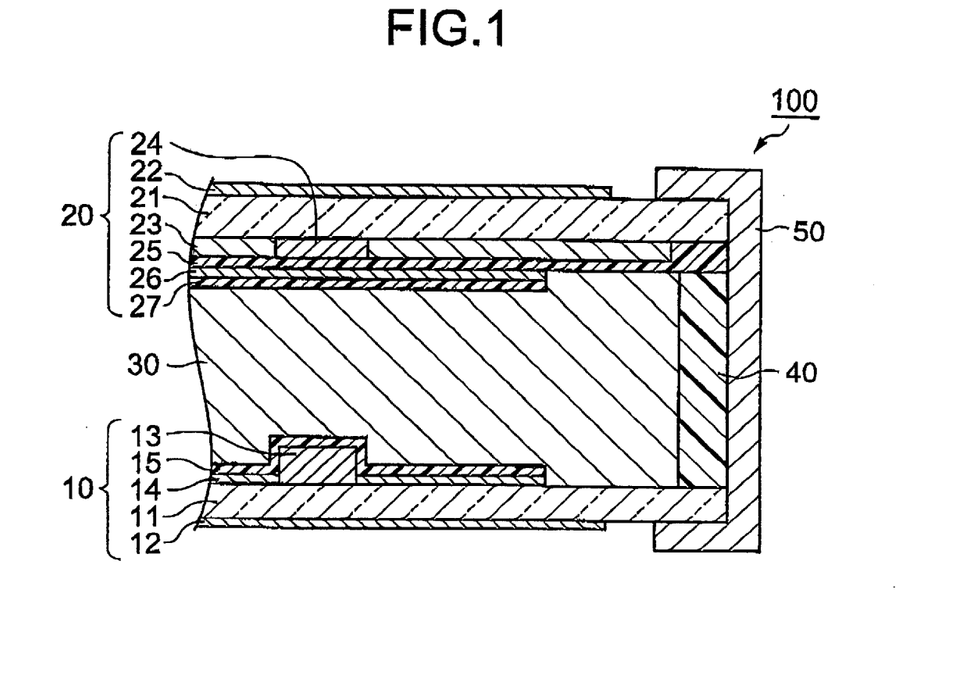
FIG. 1 is a partial cross-sectional view of a liquid-crystal display element in Example 4.

For example, as shown in FIG. 1, the device may be set up as a TFT switching type liquid-crystal display element 100 having a driving circuit substrate member 10 and a filter substrate member 20 which are disposed opposingly to each other, and a liquid-crystal layer 30 held between them. The liquid-crystal layer 30 is sealed at a sealing part 40, and the two substrate members 10 and 20 are supportedly held with a frame 50 at that part The driving circuit substrate member 10 has a transparent substrate 11 made of glass, resin or the like, a polarized-light film 12 formed on one side of the transparent substrate 11, and formed on the other side thereof a thin-film transistor 13 and a transparent electrode 14 such as ITO (indium tin oxide), and a liquid-crystal alignment film 15 so formed as to cover them.

The fiter substrate member 20 has a transparent substrate 21 made of glass, resin or the like, a polarized-light film 22 formed on one side of the transparent substrate 21, and formed on the other side thereof a color filter 23 and a black matrix 24, an overcoat layer 25 which are so formed as to cover them, a transparent electrode 26 such as ITO formed on the surface of the overcoat layer 25, and a liquid-crystal alignment film 27 formed on the surface of the transparent electrode 26.

In the example shown here, the liquid-crystal alignment films 15 and 27 are provided on both the two substrate members 10 and 20, respectively, and the two substrate members 10 and 20 are so disposed that the two liquid-crystal alignment films 15 and 27 stand opposite to each other. At least one or both of the two liquid-crystal alignment films 15 and 27 is/are comprised of a cured product of the material for liquid-crystal alignment films according to the present invention.

In the example shown here, the color filter 23 is provided. Without limitation thereto, in the present invention, a liquid-crystal display element of monochromatic display may instead be provided. Here is also described the device taking the case of an active matrix type liquid-crystal display element making use of TFT as a switching element for selecting pixels. Without limitation thereto, in the present invention, the element may also be a liquid-crystal display element of any other driving system.

Such a liquid-crystal display element may be produced, e.g., in the following way.

First, on the surface of the transparent substrate 11, the transparent electrode 14 and the thin-film transistor 13 are formed in prescribed patterns. Thereafter, the material for liquid-crystal alignment films according to the present invention is so coated as to cover the transparent electrode 14 and the thin-film transistor 13, followed by baking to form a resin film comprised of a polyamide or polyimide. The surface of the resin film thus obtained is subjected to rubbing to make it into the liquid-crystal alignment film 15, and then a sealing material 40 is printed, followed by drying. Thus, the driving circuit substrate member 10 is obtained.

Then, on the surface of the transparent substrate 21, the color filter 23 and the black matrix 24 are formed in prescribed patterns, and the overcoat layer 25 is so formed as to cover them. Thereafter, on the surface of the overcoat layer 25, the transparent electrode 26 is formed, and the material for liquid-crystal alignment films according to the present invention is so coated as to cover the transparent electrode 26, followed by baking to form a resin film comprised of a polyamide or polyimide. The surface of the resin film thus obtained is subjected to rubbing to make it into the liquid-crystal alignment film 27. Thus, the filter substrate member 20 is obtained.

Subsequently, the driving circuit substrate member 10 and the filter substrate member 20 are set opposite to each other with their liquid-crystal alignment films 15 and 27 sides inside, and are fixed with the frame 50, adjusting the substrate members 10 and 20 so that their opposing distance is kept uniform. Thereafter, the sealing material 40 is baked, and the liquid crystal 30 is injected into the space between the substrate members 10 and 20, followed by sealing. After the liquid crystal has been subjected to re-alignment, and after cleaning, the polarized-light films 12 and 22 are stuck on the outside surfaces of the substrate members 10 and 20. Thus, the liquid-crystal display element 100 is obtained.

Figure 2:
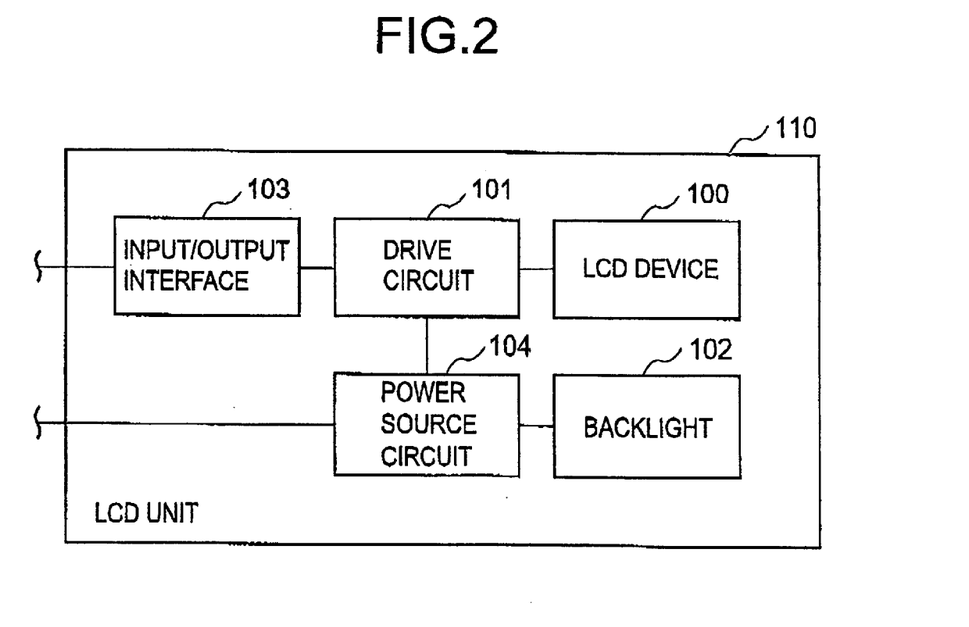
FIG. 2 is a function diagram of a liquid-crystal display unit in Example 4.

The liquid-crystal display element of the present invention may also be assembled together with a power source system, a drive system and so forth to set up the liquid-crystal display unit of the present invention. For example, as shown in FIG. 2, a liquid-crystal display unit 110 of the present invention has the liquid-crystal display element 100 of the present invention, an integrated circuit 101 for driving the liquid-crystal display element, a backlight 102, an input/output interface 103 and a power source circuit 104.

According to the present invention liquid-crystal alignment films can be formed which satisfy the properties such as voltage holding ratio, pre-tilt angles, residual DC voltage, printability, adherence and solution storage stability and at the same time have much superior step-covering properties, and a highly reliable, superior liquid-crystal display element and liquid-crystal display unit can be produced in a good yield.

The Preferred Embodiments

EXAMPLE 1

(1) Synthesis of First Polyamide:

Into a 200 ml four-necked flask, 3.14 g (0.016 mole) of cyclobutanetetracacboxylic dianhydride, 3.49 g (0.016 mole) of pyromellitic dianhydride, 3.85 g (0.064 mole) of n-propanol, 5.06 g (0.064 mole) of pyridine and 60 ml of N-methyl-2-pyrrolidone (NMP) were introduced and then stirred at 60° C., whereupon a transparent solution was formed in 1 hour. This solution was further stirred for 7 hours at room temperature. Thereafter, the flask was cooled with ice, and 9.88 g (0.083 mole) of thionyl chloride was dropwise added thereto over a period of 10 minutes, followed by stirring at room temperature for 1 hour to obtain a solution containing acid chloride.

Into another 200 ml four-necked flask, 7.32 g (0.026 mole) of 4,4'-diamino-3,3'-dicarboxydiphenylmethane, 2.42 g (0.0064 mole) of 1,3-bis(4-aminophenoxymethyl)-1,1,3,3-tetramethyldisiloxane, 5.06 g (0.064 mole) of pyridine and 50 ml of N-methyl-2-pyrrolidone (NMP) were introduced and then the flask was cooled with ice, where the above acid chloride solution was slowly dropwise added over a period of 1 hour with stirring while keeping the temperature at 10° C. or below.

Thereafter, the reaction solution was stirred at room temperature for 1 hour, and then poured into 1 liter of water, and the polymer precipitated was collected by filtration, followed by washing with water twice, and then vacuum drying to obtain 19 g of polyamide (A-1). Weight-average molecular weight of this polymer was measured by GPC (gel permeation chromatography) to find that it was 20,000 in terms of polystyrene.

The polyamide (A-1) is the first polyamide which is a copolymer having first repeating units represented by the following structural formulas (12) and fourth repeating units represented by the following structural formulas (13).

-continued (13)

and

In the formulas, $R^9$s are any of two organic groups represented by the following structural formulas (14).

(14)

and

(2) Synthesis of Second Polyamide:

Into a 200 ml four-necked flask, 9.6 g (0.032 mole) of 3,4-dicarboxy-1,2,3,4-tetrahydro-1-naphthalenesuccinic dianhydride (hereinafter "TDA"), 3.46 g (0.0576 mole) of n-propanol, 1.55 g (0.0064 mole) of n-hexadecanol, 5.06 g (0.064 mole) of pyridine and 60 ml of N-methyl-2-pyrrolidone (hereinafter "NMP") were introduced and then stirred at 60° C., whereupon a transparent solution was formed in 1 hour. This solution was further stirred for 7 hours at room temperature. Thereafter, the flask was cooled with ice, and 9.88 g (0.083 mole) of thionyl chloride was dropwise added thereto over a period of 10 minutes, followed by stirring at room temperature for 1 hour to obtain a solution containing acid chloride.

Into another 200 ml four-necked flask, 2.76 g (0.056 mole) of p-phenylenediamine, 2.42 g (0.0064 mole) of 1,3-bis(4-aminophenoxymethyl)-1,1,3,3-tetramethyldisiloxane, 5.06 g (0.064 mole) of pyridine and 50 ml of NMP were introduced and then the flask was cooled with ice, where the above acid chloride solution was slowly dropwise added over a period of 1 hour with stirring (keeping the temperature at 10° C. or below).

Thereafter, the reaction solution was stirred at room temperature for 1 hour, and then poured into 1 liter of water, and the polymer precipitated was collected by filtration, followed by washing with water twice, and then vacuum drying to obtain 15 g of polyamide (B-1). Weight-average molecular weight of this polymer was measured by GPC (gel permeation chromatography) to find that it was 21,000 in terms of polystyrene.

The polyamide (B-1) is the second polyamide which is a copolymer having second repeating units represented by the following structural formulas (15) when $R^{10}$s are each a n-propyl group, and having third repeating units represented by the following structural formulas (15) when $R^{10}$s are each a n-hexadecyl group.

(15)

and

In the formulas, $R^{11}$s are any of two organic groups represented by the following structural formulas (16).

(16)

(3) Preparation of Material for Liquid-Crystal Alignment Films:

Next, the polyamide (A-1) and the polyamide (B-1) were mixed in a weight ratio of (A-1)/(B-1)=4/1, and the mixture obtained was diluted with a mixed solvent of γ-butylolactone and ethylene glycol-n-butyl ether (weight ratio: 87/13), followed by thorough stirring to obtain a solution having a total solid-matter concentration of 4%.

To this solution, in order to remove chlorine ions, poly (4-vinylypyridine) (cross-linked by 2%; 60 meshes; a product of Acros organics) was added in an amount equal to that of polyamides, and the resultant mixture was stirred in a beaker for 4 hours, followed by filtration with a filter of 5 μm in pore size to effect purification of the solution. Thus, a material for liquid-crystal alignment films was obtained.

In order to ascertain the viscosity stability of this material for liquid-crystal alignment films, the solution was left at 23° C., where a change in viscosity after 30 days was at a rate as low as 2.5% of the initial viscosity.

(4) Production of Liquid-Crystal Cell:

The solution having been purified was printed on each of two glass substrates with transparent electrodes, by means of a screen printer, followed by hot-plate baking at 70° C. for 1 minute to obtain polyamide resin films of 1,000 angstroms in layer thickness. The resin films obtained were films having neither pinholes nor print unevenness and having a good adherence.

These resin films were subjected to rubbing with a rubbing cloth made of velvet, to make them into liquid-crystal alignment films. Then, the resultant two glass substrate members were set opposite to each other with their liquid-crystal alignment film sides inside in such a way that the rubbing directions stood anti-parallel interposing a spacer of 20 μm high, and were fixed with the sealing material and the frame, where a liquid crystal (HA5073LA, available from Chisso Petrochemical Corporation) was injected into the space between the substrate members, followed by sealing to produce a liquid-crystal cell.

The state of alignment of this liquid-crystal cell was observed with a polarizing microscope to ascertain that the liquid-crystal stood aligned in a defect-free and uniform state. On this cell, the pre-tilt angle of liquid-crystal molecules was measured by the crystal rotation method to find that it was 6.0°, thus the cell had a high pre-tilt angl required as TFT alignment films.

Next, to measure electrical properties of the liquid-crystal cell, a 90° twist liquid-crystal cell was produced using substrates on which polyamide films were formed and subjected to rubbing in the same manner as in the above, where, after a spacer of 6 μm was sprayed over the film surfaces, the directions of rubbing were set to fall substantially at right angles, and a liquid crystal (HA5073LA, available from Chisso Petrochemical Corporation) was injected into the space between the substrate members. The state of alignment of this liquid-crystal cell was observed with a polarizing microscope to ascertain that the liquid-crystal stood aligned in a defect-free and uniform state.

On this liquid-crystal cell, the voltage holding ratio was measured to find that the cell showed a value of as high as 99.5% at 23° C. Also, residual DC voltage was measured by "the dielectric absorption method" in which a direct current of 5 V was applied to this cell at 23° C. for 30 minutes and then left for one second in that state and any residual DC voltage remaining in the liquid-crystal cell after 10 minutes was measured. As a result, it was 0.10 V, showing a good property having a small accumulation of electric charges.

EXAMPLE 2

19 g of the first polyamide, polyamide (A-2), was obtained in the same manner as in Example 1 except that 3.95 g (0.026 mole) of 3,5-diaminobenzoic acid was used in place of 4,4'-diamino-3,3'-dicarboxydiphenylmethane. Weight-average molecular weight of this polymer was measured by GPC (gel permeation chromatography) to find that it was 23,000 in terms of polystyrene.

The polyamide (A-2) is the first polyamide which is a copolymer having first repeating units represented by the above structural formulas (12) when $R^9$s are each any of two organic groups represented by the following structural formulas (17), and having fourth repeating units represented by the above structural formulas (13).

A material for liquid-crystal alignment films was prepared in the same manner as in Example 1 except that the polyamide (A-2) was used in place of the polyamide (A-1). In order to ascertain the viscosity stability of this material for liquid-crystal alignment films, the solution was left at 23° C., where a change in viscosity after 30 days was at a rate as low as 1.9% of the initial viscosity.

Subsequently, the material for liquid-crystal alignment films, thus obtained, was printed on each of two glass substrates with transparent electrodes, by means of a screen printer in the same manner as in Example 1, followed by hot-plate baking at 70° C. for 1 minute to obtain polyamide resin films of 1,000 angstroms in layer thickness. The resin films obtained were films having neither pinholes nor print unevenness and having a good adherence.

These resin films were subjected to rubbing with a rubbing cloth made of velvet, and thereafter a liquid-crystal cell was produced in the same manner as in Example 1. The state of alignment of this liquid-crystal cell was observed with a polarizing microscope to ascertain that the liquid-crystal stood aligned in a defect-free and uniform state. On his cell the pre-tilt angle of liquid-crystal molecules was also measured by the crystal rotation method to find that it was 5.5°, thus the cell had a high pre-tilt angle required as TFT alignment films.

Next, a 90° twist liquid-crystal cell was produced in the same manner as in Example 1, and the state of alignment of this liquid-crystal cell was observed with a polarizing microscope to ascertain that the liquid-crystal stood aligned in a defect-free and uniform state. On this liquid-crystal cell, the voltage holding ratio was also measured to find that the cell showed a value of as high as 99.0% at 23° C. On this liquid-crystal cell, residual DC voltage was still also measured in the same manner as in Example 1. As a result, it was 0.12 V, showing a good property having a small accumulation of electric charges.

EXAMPLE 3

15 g of the second polyamide, polyamide (B-2), was obtained in the same manner as in Example 1 except that the n-propanol was added in an amount of 3.07 g (0.0512 mole) and the n-hexadecanol in an amount of 3.10 g (0.0128 mole). Weight-average molecular weight of this polymer was measured by GPC (gel permeation chromatography) to find that it was 20,000 in terms of polystyrene.

A material for liquid-crystal alignment films was prepared in the same manner as in Example 1 except that the polyamide (B-2) was used in place of the polyamide (B-1). In order to ascertain the viscosity stability of this material for liquid-crystal alignment films, the solution was left at 23° C., where a change in viscosity after 30 days was at a rate as low as 2% of the initial viscosity.

Subsequently, the material for liquid-crystal alignment films, thus obtained, was printed on each of two glass substrates with transparent electrodes, by means of a screen printer in the same manner as in Example 1, followed by hot-plate baking at 70° C. for 1 minute to obtain polyamide resin films of 1,000 angstroms in layer thickness. The resin films obtained were films having neither pinholes nor print unevenness and having a good adherence.

These resin films were subjected to rubbing with a rubbing cloth made of velvet, and thereafter a liquid-crystal cell was produced in the same manner as in Example 1. The state of alignment of this liquid-crystal cell was observed with a polarizing microscope to ascertain that the liquid-crystal stood aligned in a defect-free and uniform state. On this cell, the pre-tilt angle of liquid-crystal molecules was also measured by the crystal rotation method to find that it was 6.7°, thus the cell had a high pre-tilt angle required as TFT alignment films.

Next, a 90° twist liquid-crystal cell was produced in the same manner as in Example 1, and the state of alignment of this liquid-crystal cell was observed with a polarizing microscope to ascertain that the liquid-crystal stood aligned in a defect-free and uniform state. On this liquid-crystal cell, the voltage holding ratio was also measured to find that the cell showed a value of as high as 99.6% at 23° C. On this liquid-crystal cell, residual DC voltage was still also measured in the same manner as in Example 1. As a result, it was 0.12 V, showing a good property having a small accumulation of electric charges.

EXAMPLE 4

Figure 3A:
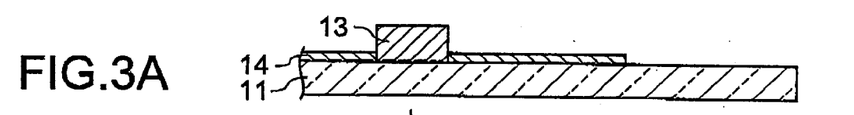
FIGS. 3A to 3C show the steps of producing a driving circuit substrate member in Example 4.
Figure 3B:
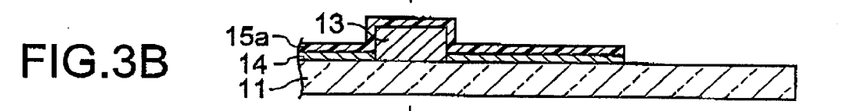
Figure 3C:
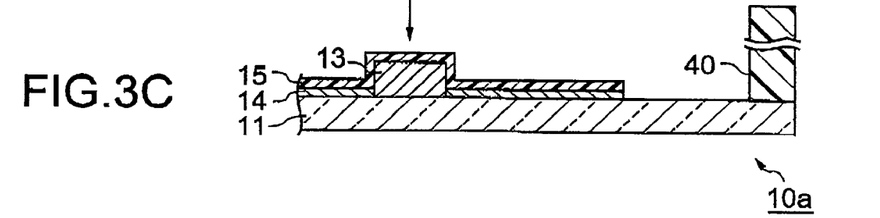

A. Production of Liquid-crystal Display Element (1) Production of Driving Circuit Substrate Member:

As shown in FIGS. 3A to 3C, first, on the surface of a transparent substrate 11, a transparent electrode 14 and a thin-film transistor 13 were formed in prescribed patterns (FIG. 3A). Then, the material for liquid-crystal alignment films obtained in Example 1 was so coated as to cover these, followed by hot-plate baking at 70° C. for 1 minute to form a polyamide resin film 15a of 1,000 angstroms in layer thickness (FIG. 3B).

The surface of this resin film 15a was subjected to rubbing to make it into a liquid-crystal alignment film 15, and then a sealing material was printed to form a frame-shaped pattern, followed by drying to provide a sealing part 40. Thus, a driving circuit substrate member 10a was obtained (FIG. 3C).

Figure 4A:
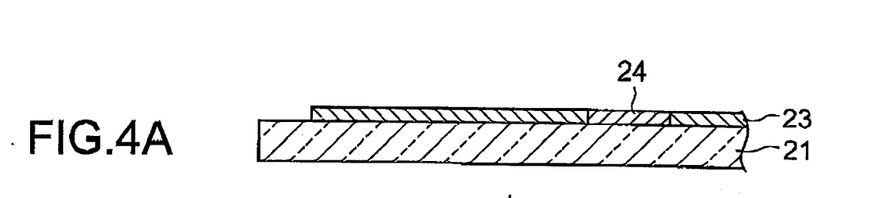
FIGS. 4A to 4E show the steps of producing a filter substrate member in Example 4.

(2) Production of Filter Substrate Member:

As shown in FIGS. 4A to 4E, on the surface of the transparent substrate 21, a photosensitive resin composition containing a black coloring matter was coated in a prescribed pattern, followed by exposure and development in the prescribed pattern to form a black matrix 24, and thereafter photosensitive resin compositions respectively containing a red coloring matter, a green coloring matter and a blue coloring matter were coated in the same way, followed by exposure and development in the prescribed pattern to form a color filter 23 (FIG. 4A).

Figure 4B:
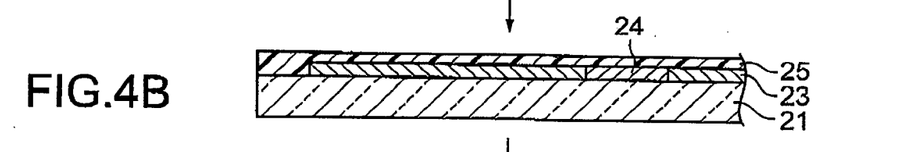
Figure 4C:
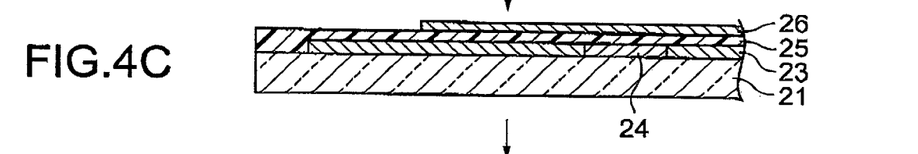
Figure 4D:
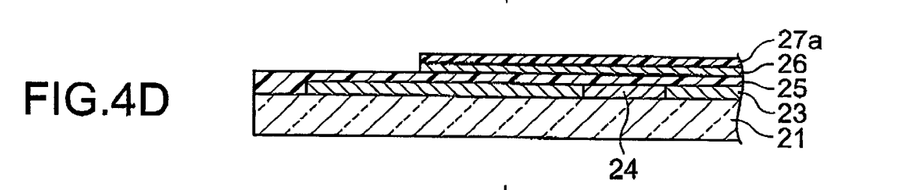

Subsequently, an overcoat layer 25 was so formed as to cover the color filter 23 and the black matrix 24 (FIG. 4B). Thereafter, on its surface, a transparent electrode 26 is formed in a prescribed pattern (FIG. 4C), and the material for liquid-crystal alignment films obtained in Example 1 was so coated as to cover the transparent electrode 26, followed by hot-plate baking at 70° C. for 1 minute to form a polyamide resin film 27a of 1,000 angstroms in layer thickness (FIG. 4D).

Figure 4E:
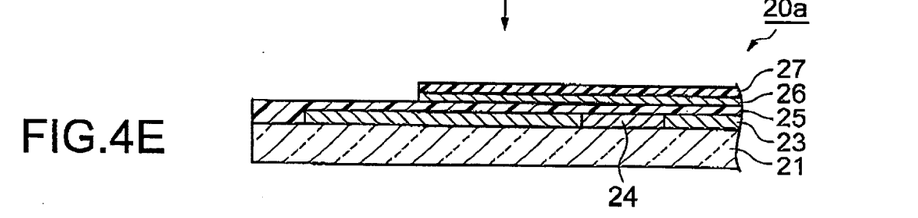

The surface of this resin film 27a obtained was subjected to rubbing to make it into a liquid-crystal alignment film 27. Thus, a filter substrate member 20a was obtained (FIG. 4E).

Figure 5A:
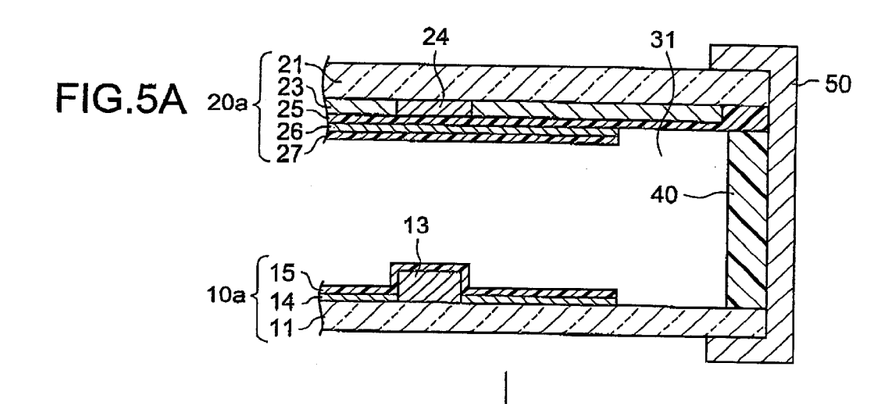
FIGS. 5A and 5B show the steps of producing a liquid-crystal display element in Example 4.
Figure 5B:
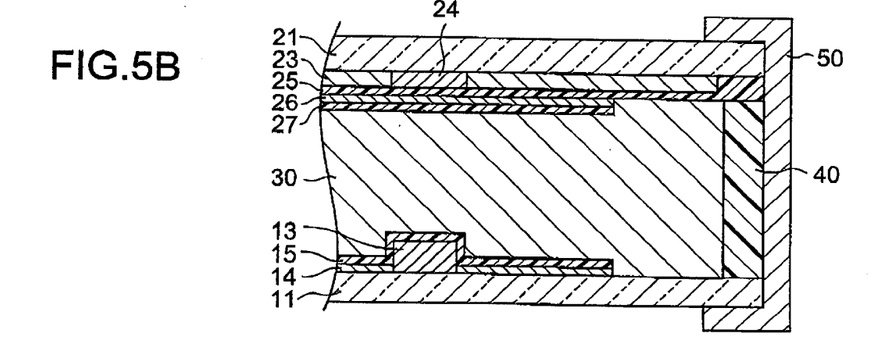

(3) Assemblage of Liquid-Crystal Display Element:

As shown in FIGS. 5A and 3B, the driving circuit substrate member 10a and the filter substrate member 20a were set opposite to each other and put together with their liquid-crystal alignment films 15 and 27 sides inside in such a way that the rubbing directions stood anti-parallel interposing a spacer of 20 $\mu$m high, and were fixed with the frame 50, adjusting the substrate members 10a and 20a so that their opposing distance is kept uniform (FIG. 5A).

Subsequently, a liquid crystal (HA5073LA, available from Chisso Petrochemical Corporation) was injected into the space 31 between the substrate members 10a and 20a, followed by sealing to produce a liquid-crystal cell (FIG. 5A). Thereafter, the liquid crystal was subjected to re-alignment and then cleaned, and polarized-light films 12 and 22 were stuck on the outside surfaces of the transparent substrates 11 and 21. Thus, the liquid-crystal display element 100 shown in FIG. 1 was obtained.

The liquid-crystal display element thus obtained, like the liquid-crystal cell in Example 1, was in a good state of alignment and had a high pre-tilt angle, showing good results on both the voltage holding ratio and the residual DC voltage. Also, the steps (difference in level) due to the electrodes 14 and 26, TFT 13, the color filter 24 and so forth were perfectly stood covered with the liquid-crystal alignment films 15 and 17 without any defects.

B. Production of Liquid-Crystal Display Unit

Using the liquid-crystal display element 100, as shown in FIG. 2, a liquid-crystal display unit was assembled together with the integrated circuit 101 for driving the liquid-crystal display element, the backlight 102, the input/output interface 103 and the power source circuit 104. As a result, a highly reliable good product was obtainable.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A process for producing a liquid-crystal display element, comprising the steps of:

forming a transistor on a substrate;

forming a resin film on said transistor; and rubbing the resin film to make the resin film into a liquid-crystal alignment film, wherein the step of forming said resin film comprises the sub-steps of:

applying a resin solution prepared with a polyamide (A-1) which is a copolymer having repeating units represented by the following structural formulas (1) and (2), and, with a polyamide (B-1) which is a copolymer having repeating units represented by the following structural formulas (4), to form an applied film; and curing said applied film to obtain said resin film, (1)

(2)

wherein the $R^9$s are at least one of two organic groups represented by the following structural formulas (3):

(3)

(4)

-continued wherein, the $R^{10}$s are at least one of a n-propyl group and a n-hexadecyl group, and the $R^{11}$s are at least one of two organic groups represented by the following structural formulas (5):

(5)

2. A process for producing a liquid-crystal display element, comprising the steps of:
forming a transistor on a substrate;
forming a resin film on said transistor; and
rubbing the resin film to make the resin film into a liquid-crystal alignment film, wherein the step of forming said resin film comprises the sub-steps of:
applying a resin solution prepared with a polyamide (A-2) which is a copolymer having repeating units represented by the following structural formulas (1) and (2), and a polyamide (B-1) which is a copolymer having repeating units represented by the following structural formulas (4), to form an applied film; and
curing said applied film to obtain said resin film, (1)

-continued (2)

wherein the $R^9$s are at least one of two organic groups represented by the following structural formulas (6):

(6)

(4)

-continued wherein the $R^{10}$s are at least one of a n-propyl group and a n-hexadecyl group, and the $R^{11}$s are at least one of two organic groups represented by the following structural formulas (5):

(5)

* * * * *